Aug. 3, 1943.  G. L. CLAYBOURN  2,325,663
SYSTEM OF ELECTRIC POWER DISTRIBUTION
Filed Feb. 13, 1942    2 Sheets-Sheet 1
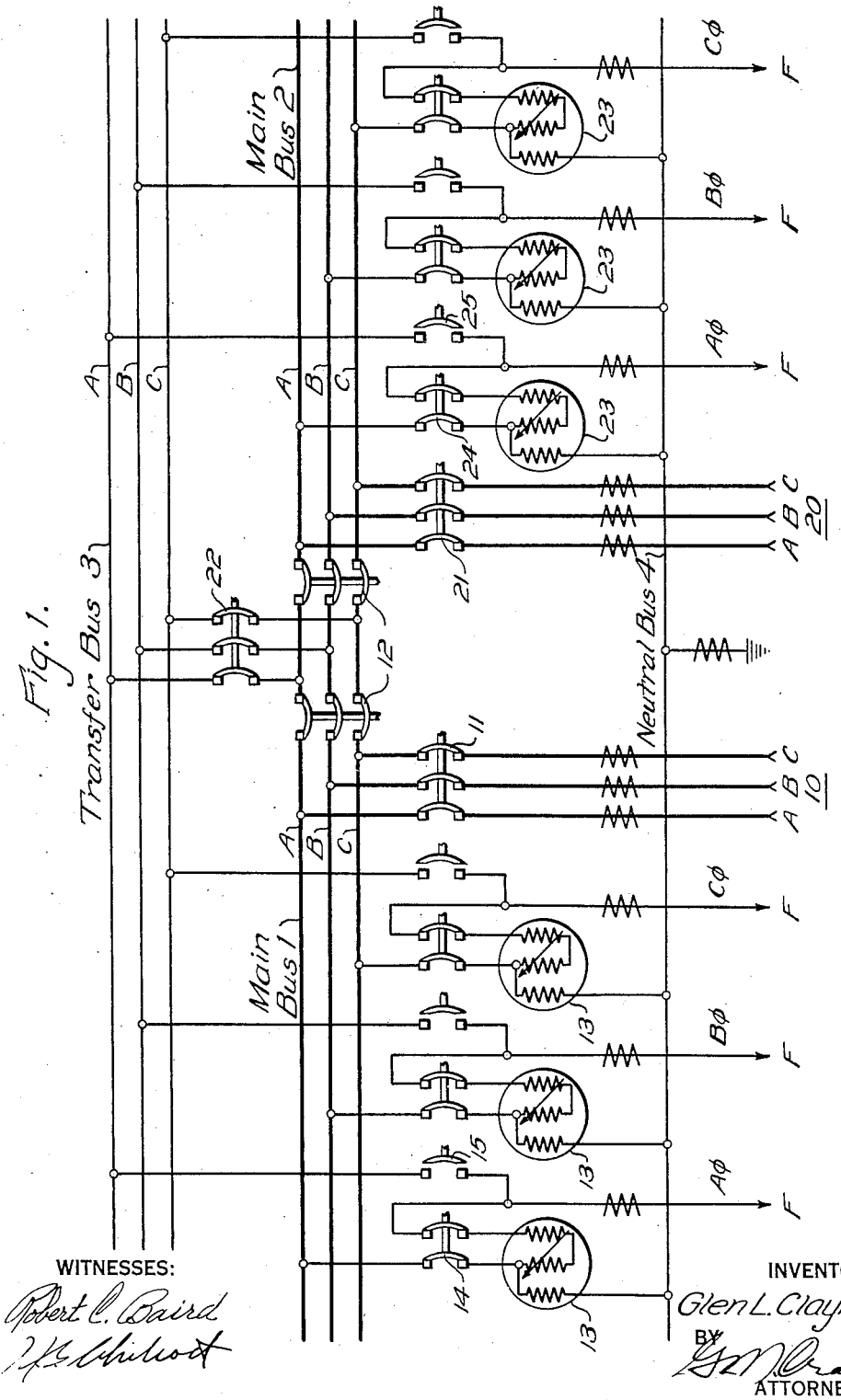

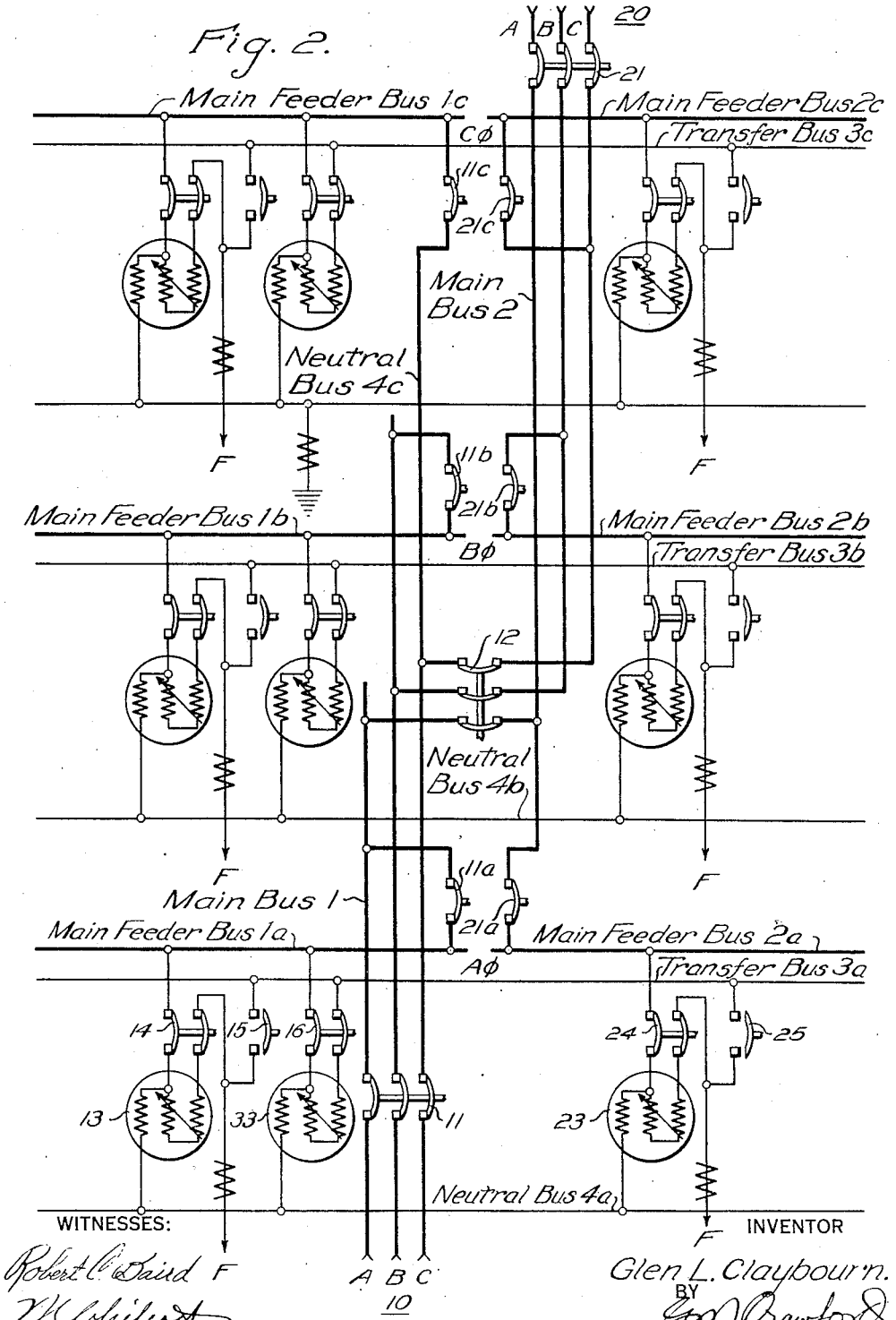

Patented Aug. 3, 1943

2,325,663

UNITED STATES PATENT OFFICE 2,325,663

SYSTEM OF ELECTRIC POWER DISTRIBUTION

Glen L. Claybourn, Pittsburgh, Pa., assignor to Westinghouse Electric & Manufacturing Company, East Pittsburgh, Pa., a corporation of Pennsylvania Application February 13, 1942, Serial No. 430,704

8 Claims. (Cl. 171—97)

My invention relates, generally, to systems of electric power distribution and, more particularly, to three-phase, four-wire distribution systems having main and transfer buses and feeder circuits energized from said buses.

In systems of the foregoing type, it is customary to provide voltage regulators for the feeder circuits. In order to permit a feeder regulator to be taken out of service without interrupting the supply of power to the feeder circuit, the feeder is temporarily connected to the transfer bus. In prior systems, the transfer has been made by manually operable disconnecting switches, which is not entirely satisfactory, particularly from the standpoint of safety.

An object of my invention, generally stated, is to provide a system of distribution which shall be simple and efficient in operation and which may be readily installed.

A more specific object of my invention is to provide a system of distribution in which all switching operations are performed by automatic circuit breakers.

Another object of my invention is to utilize a minimum number of circuit breaker units for performing the required switching operations in a system of distribution.

A further object of my invention is to reduce the space required for the switchgear apparatus in a power distribution system.

Other objects of my invention will be explained fully hereinafter or will be apparent to those skilled in the art.

In accordance with my invention, the main feeder bus of a system of distribution is connected to an auxiliary device, such as the induction voltage regulator of a single-phase feeder circuit, through one pole of a two-pole circuit breaker unit. The regulator or auxiliary device is connected to the single-phase feeder circuit through the second pole of the same two-pole breaker unit. A single-pole breaker unit is utilized to connect the feeder circuit to the transfer bus. In this manner, the main bus and the regulator or auxiliary device are protected and isolated by the operation of a single breaker unit. At the same time, the single-pole breaker unit will maintain electrical energy on the feeder circuit from the respective phase of the auxiliary or transfer bus.

For a fuller understanding of the nature and objects of my invention, reference may be had to the following detailed description, taken in conjunction with the accompanying drawings, in which:

Figure 1 is a diagrammatic view of a system of distribution embodying my invention; and Fig. 2 is a diagrammatic view of a modification of the invention.

Referring to Fig. 1 of the drawings, the system shown therein comprises a pair of three-phase main buses 1 and 2, a three-phase transfer bus 3, a neutral bus 4, and a plurality of single-phase feeder circuits F. Power is supplied to the main bus 1 through a three-phase line 10, which is connected to the main bus 1 by means of a three-pole circuit breaker 11. Likewise, power is supplied to the main bus 2 through a three-phase line 20, connected to the bus 2 by means of a three-pole circuit breaker 21.

The main buses 1 and 2 may be connected together by a pair of three-pole circuit breakers 12. The transfer bus 3 may be energized from either the main bus 1 or the main bus 2, or from both buses in case both of the bus tie breakers 12 are closed, by closing a three-pole circuit breaker 22.

As explained hereinbefore, it is the usual practice in power distribution systems to provide an induction voltage regulator for each one of the feeder circuits to maintain a desired voltage on the feeder circuit. In the present system, an induction voltage regulator 13 is provided for each one of the feeder circuits F which are energized from the main bus 1, and an induction voltage regulator 23 is provided for each feeder circuit energized from the main bus 2. As shown, the current coils of the regulators are connected in series circuit relation with the feeder circuits, and the potential coils are connected between the feeder conductors and the neutral bus 4, thereby being responsive to the potential impressed on each feeder circuit.

It is also the usual practice to provide for transferring each feeder circuit from the main bus to the transfer bus in the event that it is desired to take the voltage regulator or other auxiliary device out of service, thereby maintaining power on the feeder circuit while the regulator is out of service. In prior systems, manually operated disconnect switches have been provided for performing a part of the switching operations necessary to take a regulator out of service.

In order to simplify the switching operations required for taking a regulator out of service, and also to increase the safety to the operator performing the switching operations, a two-pole circuit breaker 14 and a single-pole circuit breaker 15 are provided for each one of the feeder circuits energized from the main bus 1, and, similarly, a two-pole circuit breaker 24 and a single-pole circuit breaker 25 are provided for each feeder circuit energized from the main bus 2.

As shown, one phase of the main bus is connected to the regulator or auxiliary device through one pole of the two-pole breaker unit. The regulator is connected to the single-phase feeder circuit through the second pole of the same two-pole breaker unit. The feeder circuit may also be connected to the corresponding phase of the transfer bus 3 by the single-pole circuit breaker unit. In this manner, the main bus and the regulator are protected and isolated by the operation of a single breaker unit. At the same time, the single-pole breaker unit may be closed to maintain electrical energy on the feeder circuit from the corresponding phase of the transfer or auxiliary bus.

It is apparent from the foregoing description and the diagram that the present system provides for easy and safe maintenance or replacement of a breaker unit and its associated regulator or other auxiliary device. Also, only two switching operations are required to take a regulator out of service—first, the closing of a single-pole breaker, and then the opening of a two-pole breaker, thereby completely isolating the regulator.

Furthermore, the transfer of power is accomplished by devices designed for interrupting power circuits. The present method increases the safety of operation as compared with the conventional method of utilizing a single-pole breaker with isolating disconnecting switches and transfer disconnecting switches. The transferring of power by means of disconnecting switches in a large feeder station adds to the possibility of confusion and the danger of transferring a circuit that is not properly set up and coordinated for transfer, thereby endangering both life and equipment.

While not necessarily limited thereto, the present three-phase, four-wire distribution system with circuit breaker controlled single-phase feeder circuits provides a flexible arrangement which is particularly suitable for application in substations utilizing metal-clad switchgear in which the buses and circuit breakers are enclosed in metal housings, thereby further increasing the safety of the equipment.

The system shown in Fig. 2 of the drawings is particularly suitable for application in stations utilizing metal-clad switchgear of the type disclosed and claimed in my copending application, Serial No. 430,703, filed February 13, 1942, and assigned to the assignee of this invention. The two main buses 1 and 2 supply groups of single-phase feeder breaker structures disposed at right angles to the main bus, and each main bus supplies one-half of each single-phase feeder structure. The single-phase feeder structures are each provided with a main bus, which is in two sections, such as 1a and 2a, and a transfer bus, such as 3a, which extends the full length of each single-phase structure. A neutral bus, such as 4a, also extends the full length of each single-phase structure.

Each section of a single-phase feeder bus is connected to the proper phase of a main bus by a single-pole circuit breaker unit; thus the main feeder bus 1a is connected to phase A of the main bus 1 by a single-pole breaker 11a. Likewise, the main feeder bus 2a is connected to phase A of the main bus 2 by a single-pole breaker 21a. Likewise, the main feeder buses for phases B and C are connected to the proper phases of the main buses by similar single-pole breaker units. The two main buses 1 and 2 are connected together by a three-pole bus tie breaker 12.

A two-pole circuit breaker unit and a single-pole circuit breaker unit are provided for each one of the feeder circuits, thereby affording complete protection and isolation of each voltage regulator, as described hereinbefore. As shown, one pole of the two-pole breaker unit connects the regulator to the main feeder bus, and the other pole connects the regulator to the feeder circuit. The feeder circuit may be connected to the transfer bus for the corresponding phase by the single-pole circuit breaker unit.

In the present system, the transfer bus for each phase is connected to the main feeder bus for the corresponding phase through an induction regulator 33 by means of a two-pole breaker 16. In this manner, provision is made for maintaining a regulated voltage on each transfer bus, thereby providing a regulated voltage on each feeder circuit when they are supplied from the transfer bus.

The foregoing arrangement provides the ultimate flexibility in switching control, the maximum continuity of electrical energy on the feeder circuits, and also provides all the advantages of safety, ease of maintenance and continuity of service, which are characteristics of metal-clad switchgear. However, as explained hereinbefore, the systems herein disclosed are not limited to metal-clad switchgear, but may be applied to systems utilizing switchgear of other types.

If desired, the operation of the circuit breakers for isolating the induction regulators and connecting the feeder circuits to the transfer bus may be controlled automatically by relays responsive to predetermined conditions. Thus, in case of a fault in one of the regulators the relays will automatically effect the transfer of the feeder circuit to the transfer bus and the isolation of the regulator without requiring the attention of a station attendant, thereby maintaining continuity of power on the feeder.

Since many modifications may be made in the apparatus and arrangement of parts without departing from the spirit of my invention, I do not wish to be limited other than by the scope of the appended claims.

I claim as my invention:

1. In a system of distribution, in combination, a main bus, a transfer bus, a feeder circuit, a regulator for the feeder circuit, a multi-pole circuit breaker unit for connecting the feeder circuit to the main bus in series-circuit relation with the regulator, said breaker unit being disposed to isolate the regulator from the main bus, the transfer bus and the feeder circuit, and a single-pole circuit breaker unit for connecting the feeder circuit to the transfer bus.

2. In a system of distribution, in combination, a main bus, a transfer bus, a feeder circuit, a regulator for the feeder circuit, a multi-pole circuit breaker unit for connecting the feeder circuit to the main bus in series-circuit relation with the regulator, said breaker unit being disposed to isolate the regulator from the main bus, the transfer bus and the feeder circuit, and a single-pole circuit breaker unit for connecting the feeder circuit to the transfer bus, said single-pole breaker unit being operable independently of the multi-pole breaker unit.

3. In a system of distribution, in combination, a main bus, a transfer bus, a feeder circuit, a regulator for the feeder circuit, a two-pole circuit breaker unit for connecting the feeder circuit to the main bus in series-circuit relation with the regulator, said breaker unit being disposed to isolate the regulator from the main bus, the transfer bus and the feeder circuit, and a single-pole circuit breaker unit for connecting the feeder circuit to the transfer bus, the two poles of the two-pole breaker unit being operable simultaneously and the single-pole breaker unit being operable independently of the two-pole breaker unit.

4. In a system of distribution, in combination, a main bus, a feeder circuit, an auxiliary device for the feeder circuit, and a multi-pole circuit breaker unit for connecting the feeder circuit to the main bus through said auxiliary device, said auxiliary device being connected to the main bus through one pole of the breaker unit and to the feeder circuit through another pole of the breaker unit, thereby isolating said device from the main bus and the feeder circuit when the breaker is open.

5. In a system of distribution, in combination, a main bus, a feeder circuit, a regulator for the feeder circuit, and a multi-pole circuit breaker unit for connecting the feeder circuit to the main bus in series-circuit relation with the regulator, said regulator being connected to the main bus through one pole of the breaker unit and to the feeder circuit through another pole of the breaker unit, thereby isolating said regulator from the main bus and the feeder circuit when the breaker is open.

6. In a system of distribution, in combination, a main bus, a transfer bus, a feeder circuit, a regulator for the feeder circuit, a two-pole circuit breaker unit for connecting the feeder circuit to the main bus in series-circuit relation with the regulator, and a single-pole circuit breaker unit for connecting the feeder circuit to the transfer bus, said regulator being connected to the main bus through one pole of the two-pole breaker unit and to the feeder circuit through the other pole of the two-pole breaker unit, thereby isolating said regulator from the main bus and the feeder circuit when the two-pole breaker is open.

7. In a system of distribution, in combination, a main bus, a transfer bus, a feeder circuit, a regulator for the feeder circuit, a two-pole circuit breaker unit for connecting the feeder circuit to the main bus in series-circuit relation with the regulator, and a single-pole circuit breaker unit for connecting the feeder circuit to the transfer bus, said regulator being connected to the main bus through one pole of the two-pole breaker unit and to the feeder circuit through the other pole of the two-pole breaker unit, thereby isolating said regulator from the main bus and the feeder circuit when the two-pole breaker is open, said single-pole breaker unit being operable independently of the two-pole breaker unit.

8. In a system of distribution, in combination, a main bus, a transfer bus, a feeder circuit, a regulator for the feeder circuit, a two-pole circuit breaker unit for connecting the feeder circuit to the main bus in series-circuit relation with the regulator, and a single-pole circuit breaker unit for connecting the feeder circuit to the transfer bus, said regulator being connected to the main bus through one pole of the two-pole breaker unit and to the feeder circuit through the other pole of the two-pole breaker unit, thereby isolating said regulator from the main bus and the feeder circuit when the two-pole breaker is open, the two poles of the two-pole breaker unit being operable simultaneously and the single-pole breaker unit being operable independently of the two-pole breaker unit.

GLEN L. CLAYBOURN.